United States Patent
Pojda

(12) 
(10) Patent No.: US 6,415,208 B1
(45) Date of Patent: Jul. 2, 2002

(54) APPARATUS AND METHOD FOR SURVEYING RAILS, IN PARTICULAR RUNNING RAILS FOR CRANES, SHELF HANDLING UNITS, RUNNING WHEEL BLOCK

(75) Inventor: Romuald Pojda, Schwerte (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/514,124

(22) Filed: Feb. 28, 2000

Related U.S. Application Data

(60) Provisional application No. 60/166,305, filed on Nov. 18, 1999.

(51) Int. Cl.$^7$ .......................... G01B 11/14; E01B 35/04; B61K 9/08
(52) U.S. Cl. ...................... 701/19; 340/696.1; 340/436; 342/82
(58) Field of Search ...................... 701/1, 19; 340/686.1, 340/436, 685; 342/82, 89, 85, 450, 451

(56) References Cited

U.S. PATENT DOCUMENTS

| | | | | |
|---|---|---|---|---|
| 3,705,772 A | * | 12/1972 | Andreas | 356/5 |
| 4,005,601 A | * | 2/1977 | Botello | 73/146 |
| 4,027,210 A | | 5/1977 | Weber | 318/16 |
| 4,198,164 A | * | 4/1980 | Cantor | 356/375 |
| 4,730,928 A | * | 3/1988 | Gabriel et al. | 356/373 |
| 4,846,073 A | * | 7/1989 | Boyer et al. | 104/88 |
| 4,994,661 A | * | 2/1991 | Majewski et al. | 250/203 |
| 5,331,745 A | * | 7/1994 | Jager | 33/651.1 |
| 5,790,255 A | * | 8/1998 | Jackson et al. | 356/375 |
| 5,808,981 A | * | 9/1998 | Suzuki | 369/44.28 |
| 6,057,777 A | * | 5/2000 | Dunne et al. | 340/686.1 |

FOREIGN PATENT DOCUMENTS

| | | |
|---|---|---|
| DE | 212 931 | 8/1984 |
| EP | 0 807 801 A1 | 11/1997 |
| GB | 2 268 021 A | 12/1993 |

OTHER PUBLICATIONS

Patent Abstracts of Japan, vol. 010, No. 180 (P–471) Jun. 24, 1986 & JP 61 028813A (Sumitomo Rubber Ind. Ltd.), Feb. 8, 1986.

* cited by examiner

*Primary Examiner*—Tan Nguyen
*Assistant Examiner*—Dalena Tran
(74) *Attorney, Agent, or Firm*—Henry M. Feiereisen

(57) ABSTRACT

Apparatus and method for surveying rails, in particular running rails for cranes, shelf handling units, running wheel blocks, includes a transmitter unit arranged on the rail and having a laser, which emits at least one laser beam aligned longitudinally in the direction of the rail, and a detector unit capable of traveling on the same rail longitudinally in the direction of the rail and having at least one photodetector, which confronts the laser beam and generates an electric output signal in response to the incident laser beam, for determining the local position of the laser beam in a vertical measuring surface aligned transversely to the longitudinal direction of the rail. In order to determine the change in position of the rail at high accuracy by approaching individual positions on the rail without shift of the photodetector, it is proposed to provide the photodetector with a rectangular matrix having a plurality of immediately neighboring optical sensor elements which generate electric output signals delivered to an electronic evaluation unit by which the point of impact of the laser beam in the measuring surface is solely determined in electronic manner, and to provide a proximity sensor for determining the change in distance between the transmitter unit and the detector unit.

23 Claims, 5 Drawing Sheets

APPARATUS AND METHOD FOR SURVEYING RAILS, IN PARTICULAR RUNNING RAILS FOR CRANES, SHELF HANDLING UNITS, RUNNING WHEEL BLOCK

CROSS-REFERENCES TO RELATED APPLICATIONS

This application claims benefit of prior filed provisional application Appl. No. 60/166,305, filed Nov. 18, 1999, now abandoned.

BACKGROUND OF THE INVENTION

The present invention relates to a system for surveying rails, in particular running rails for cranes, shelf handling units, running wheel blocks.

A measuring arrangement for monitoring railway tracks is known from DD 212 931 and includes a transmitter unit arranged on the track and having a laser alignment unit. The laser beam is so aligned hereby as to serve as measuring axis, fixed in space, for the track rail. The measuring arrangement includes a measuring vehicle having a traveling mechanism which has two horizontal running rollers as well as two side guide rollers on the right side and two side guide rollers on the left side. The position of the measuring vehicle in relation to the measuring axis is determined by providing a photosensor which confronts the laser beam and is configured as four-quadrant photodiode. Upon incident laser beam, the photodiode generates an electric signal which is delivered to an electronic evaluation device which controls a vertical tracing device as well as a horizontal rotary mechanism for shifting and turning the photodiode. The control is so implemented that each of the four-quadrants of the photodiode occupies in relation to the laser beam the same position. In view of the high sensibility of the photodiode, the positional determination is limited in such a measuring arrangement only by the accuracy of the mechanical adjustment.

The drawback of this conventional measuring arrangement resides in the mechanical tracing of the photodiode, which is determinative for the accuracy with respect to positional determination of the rail, i.e. in particular the positional change of the running surface of the rail. Moreover, the long measuring times as a result of the mechanical readjustment of the photodiode in the measuring plane (X-direction and Z-direction) are disadvantageous.

SUMMARY OF THE INVENTION

It is thus an object of the present invention to provide an improved system for surveying rails, obviating the aforestated drawbacks.

In particular, it is an object of the present invention to provide an improved system for surveying rails, which is capable of approaching individual positions at great accuracy in order to determine the positional change of the running surface of the rail relative to the laser beam, without requiring a shift of the photosensor.

These objects, and others which will become apparent hereinafter, are attained in accordance with the present invention by providing a transmitter unit arranged on the rail and emitting a laser beam which is aligned longitudinally in the direction of a rail and is incident on a measuring surface; a detector unit designed for mobility along the rail and having a photodetector which confronts the laser beam and has a matrix in the form of a plurality of neighboring optical sensor elements for generating electric output signals in response to the incident laser beam on the measuring surface; an electronic evaluation unit receiving the output signals from the sensor elements for determining the point of impact and thereby the position of the laser beam on the measuring surface; and a proximity sensor for determining a change in distance between the transmitter unit and the detector unit.

In accordance with the present invention, the photodetector may include a matrix of rectangular configuration with a plurality of immediately neighboring pixels (optical sensor elements) for generating the electric output signals which are delivered to the electronic evaluation unit by which the point of impact of the spatially, positionally stabilized laser beam in the measuring surface is determined solely through electronic means by evaluating the output signals of the pixels. The photodetector may be an opto-electronic camera which has arranged in front thereof a transparent diffusion screen as measuring surface which is optically projected onto the matrix of the camera. In this fashion, it is possible to determine for each spot in relation to the length of the rail the positional change of the running surface with respect to the laser beam which is fixed in space. The configuration of the photodetector in the form of a rectangular matrix permits a two-dimensional measurement of the intensity distribution (Gaussian distribution) of the laser beam, thereby realizing a precise determination of the point of impact of the principal beam direction or of the laser beam axis upon the preset measuring surface. Thus, there is no longer any need to shift the measuring surface. The adjustment of the zero point (point of reference) is necessary only once, thereby shortening the duration of the measurements and, moreover, enhancing the measuring accuracy.

Suitably, the photodetector may be configured as CCD camera. This results in a rail surveying system which is very easy to compile.

A more precise determination of the point of impact of the laser beam upon the measuring surface can be realized by a so-called subpixel resolution, through determination of the point of impact of the laser beam upon the diffusion screen by conforming the measured subpixel position of the beam image of the diffusion screen upon the matrix. This is attained by initially evaluating each image line and each image column separately in a square zone about the beam image, and subsequently averaging the outcomes. The result provides the precise position (subpixel position) of the beam within the camera image. The difference between the inputted starting position (reference point) is thus a measure for the deviation of the mobile detector unit from the ideal line. Suitably, the conformation is implemented by a computer program.

According to another feature of the present invention, the electronic evaluation unit includes a microprocessor to implement in a simple manner complex computations and control processes.

In order to determine the position of the running surface of the rail in dependence on distance, the proximity sensor may include a friction wheel which rolls on the running surface of the rail. Suitably, the friction wheel is connected with an incremental shaft encoder for determination of the travel distance of the detector unit, thereby realizing a high distance precision. The friction wheel may also be utilized to register a state of motion of the detector unit to thereby ensure a correct execution of the survey.

Suitably, the detector unit can be remote-controlled so that rails which are difficult to access can be surveyed even under adverse conditions of visibility and unfavorable conditions of the surrounding (toxic gases, vapors etc.).

The positional stabilization of the laser can be realized by an electronic level which accomplishes a high positional stability in a fairly simple manner. Suitably, the positional stability amounts to +/−1 mm deviation over 100 m rail length.

The precise approach of the measuring positions can be realized for a running rail cross section composed of flange parts and web parts, by providing at least two vertically rotatably supported guide rollers which are arranged in spaced-apart relation longitudinally in the direction of the rail, and which are forced against both side surfaces of the rail for guiding the detector unit, and by providing at least two running rollers which are arranged in spaced-apart relation longitudinally in the direction of the rail and rolling on the running surface of the rail and which are horizontally supported for rotation about pivot axes aligned transversely to the longitudinal rail direction, with at least one of the running rollers being driven.

Suitably, the vertical height of each of the guide rollers can be individually adjusted so that a survey of heavily worn rails can be implemented.

The traveling behavior of the detector unit on the rail can be enhanced, when, as viewed in longitudinal rail direction, the leading running roller is arranged behind the leading guide rollers. Also, the stability of travel can be improved, when the distance between the axis of the running roller and the axis of the immediately neighboring guide roller is one time to three times the guide roller diameter.

In order to ensure a precise movement of the detector unit, the guide rollers on one side of the rail have a fixed pivot axis and the guide rollers on the other side of the rail are forced, e.g. by a spring force, upon the side surface of the rail. The guide rollers may be supported in ball bearing, in particular, self-aligning ball bearings, to better conform the guide rollers to inclined rails.

In order to be able to travel over expansion joints and cracked rails, the guide rollers are arranged in pairs on a common transverse carrier which extends longitudinally in the direction of the rail and is articulated to the detector unit. At the same time, horizontal forces, which act during acceleration and deceleration, are thereby spread over more contact points so that a more stable guiding behavior is realized.

According to another feature of the present invention, the running rollers have a running surface which is formed in mid-section with a radial groove to realize a better stability with respect to lateral inclination as a consequence of the attained two-point contact upon the rail surface.

A safeguard of the detector unit can be implemented by providing a safety system. Defective rails or rail sections, which can lead to a crash of the detector unit, are registered in particular by providing the safety system with at least one proximity sensor for determining the distance of a reference point of the detector unit relative to the rail.

A survey of at least two rails extending in one plane can be realized by splitting the laser beam into two horizontal partial laser beams extending perpendicular to one another, for determination of the height difference of both rails with respect to a horizontal straight line extending in a vertical plane. This enables a precise measurement of the parallelism of both rails relative to one another in space in a simple manner. Suitably, the partial laser beam, which extends transversely to both rails, is positioned in the vertical plane, i.e. the vertical plane is unambiguously defined by this partial laser beam. Advantageously, one of the options for defining the reference line permits the use of the partial laser beam, which extends transversely to both rails, for formation of the horizontal straight line which is oriented in a vertical plane.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
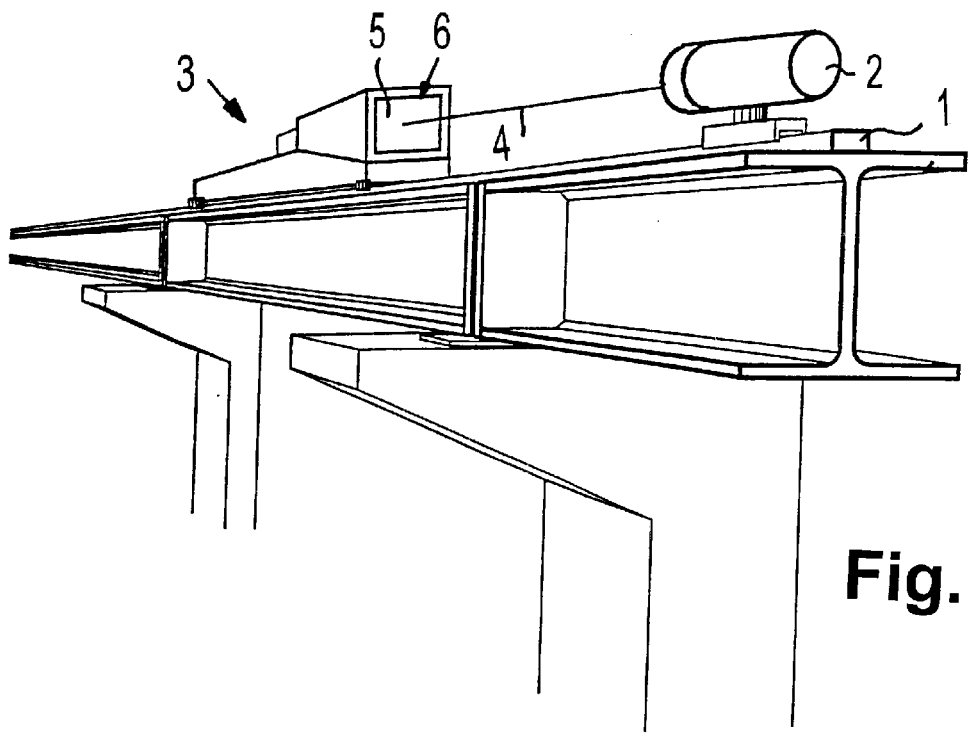
FIG. 1 is a schematic, three-dimensional illustration of an apparatus for surveying a rail, in accordance with the present invention.

Throughout all the Figures, same or corresponding elements are generally indicated by same reference numerals.

Turning now to the drawing, and in particular to FIG. 1, there is shown a schematic, three-dimensional illustration of an apparatus for surveying an exemplified rail 1. The surveying apparatus includes a transmitter unit 2, which is arranged on a rail 1, and a mobile detector unit 3 which can travel on the rail 1 and is positioned at a distance to the transmitter unit 2. The transmitter unit 2 is equipped with a laser which emits a laser beam 4 that is aligned longitudinally in the direction of the rail 1 toward a measuring surface 5 of the detector unit 3. The measuring surface 5 has a vertical disposition and extends transversely to the longitudinal direction of the rail 1.

Figure 3:
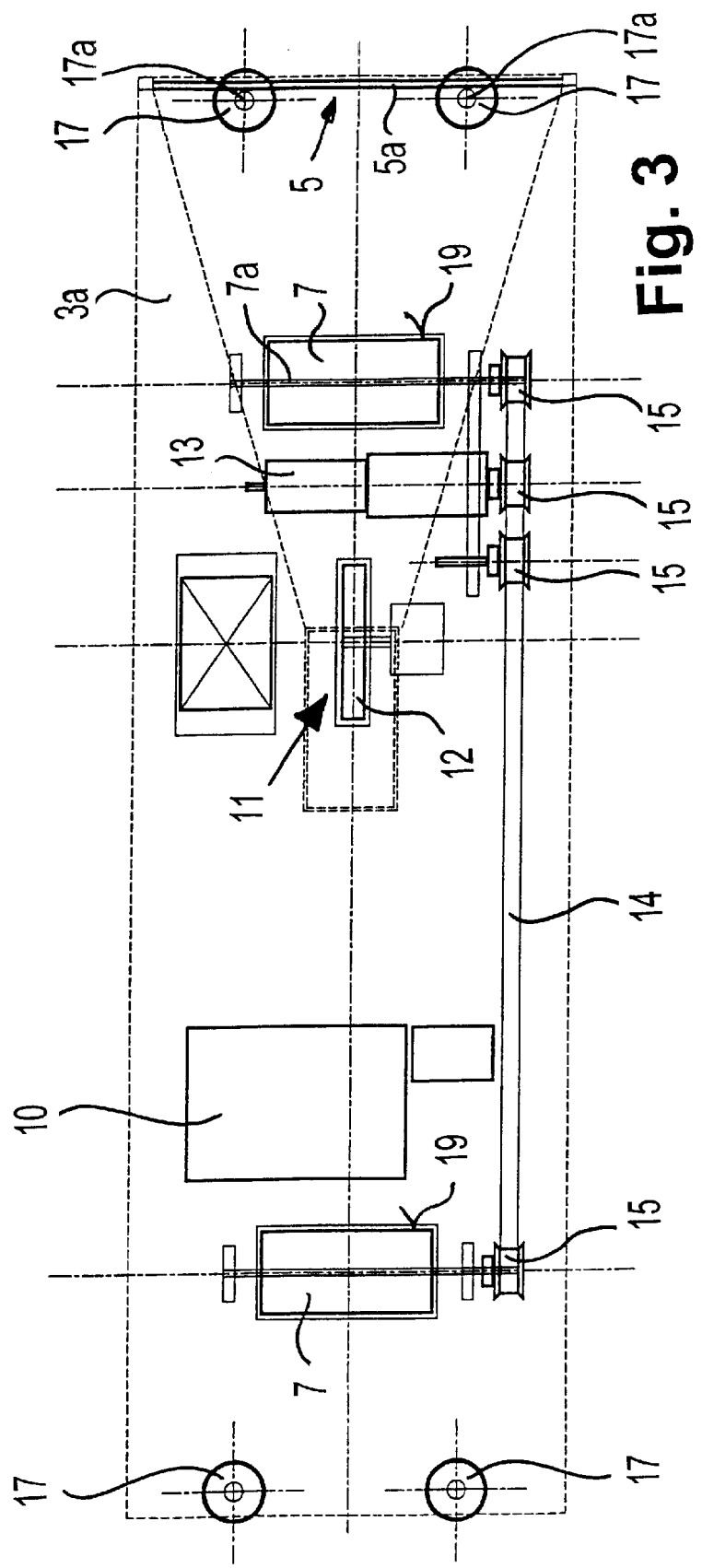
FIG. 3 is a schematic top view of a detector unit of the apparatus of FIG. 1.

As shown in FIG. 3, the detector unit 3 is arranged on a solid base panel 3a and includes a transparent diffusion screen 5a, which forms the measuring surface 5, and a photodetector 6, generally designated by reference numeral 6 and disposed interiorly behind the diffusion screen 5a in facing relation to the laser beam 4. In the non-limiting example of FIG. 4, the photodetector 6 is configured as a CCD camera 6a which has a rectangular matrix 6b with a plurality of pixels in immediate side-by-side arrangement, whereby the pixels are formed by light-sensitive sensor elements. A funnel 6d connects the photodetector 6 to the measuring surface 5. The CCD camera 6a has an imaging optics 6c to form on the matrix 6b an image of the light spot of the laser beam 4 when striking the diffusion screen 5a. Thus, as the laser beam 4 impinges on the measuring surface 5, the pixels of the matrix 6b generate electric output signals in response to the incident laser beam 4, so that the respective points of impact and thus the local position of the laser beam 4 can be interpreted in a purely electronic fashion by the electric output signals of the individual pixels.

Figure 4:
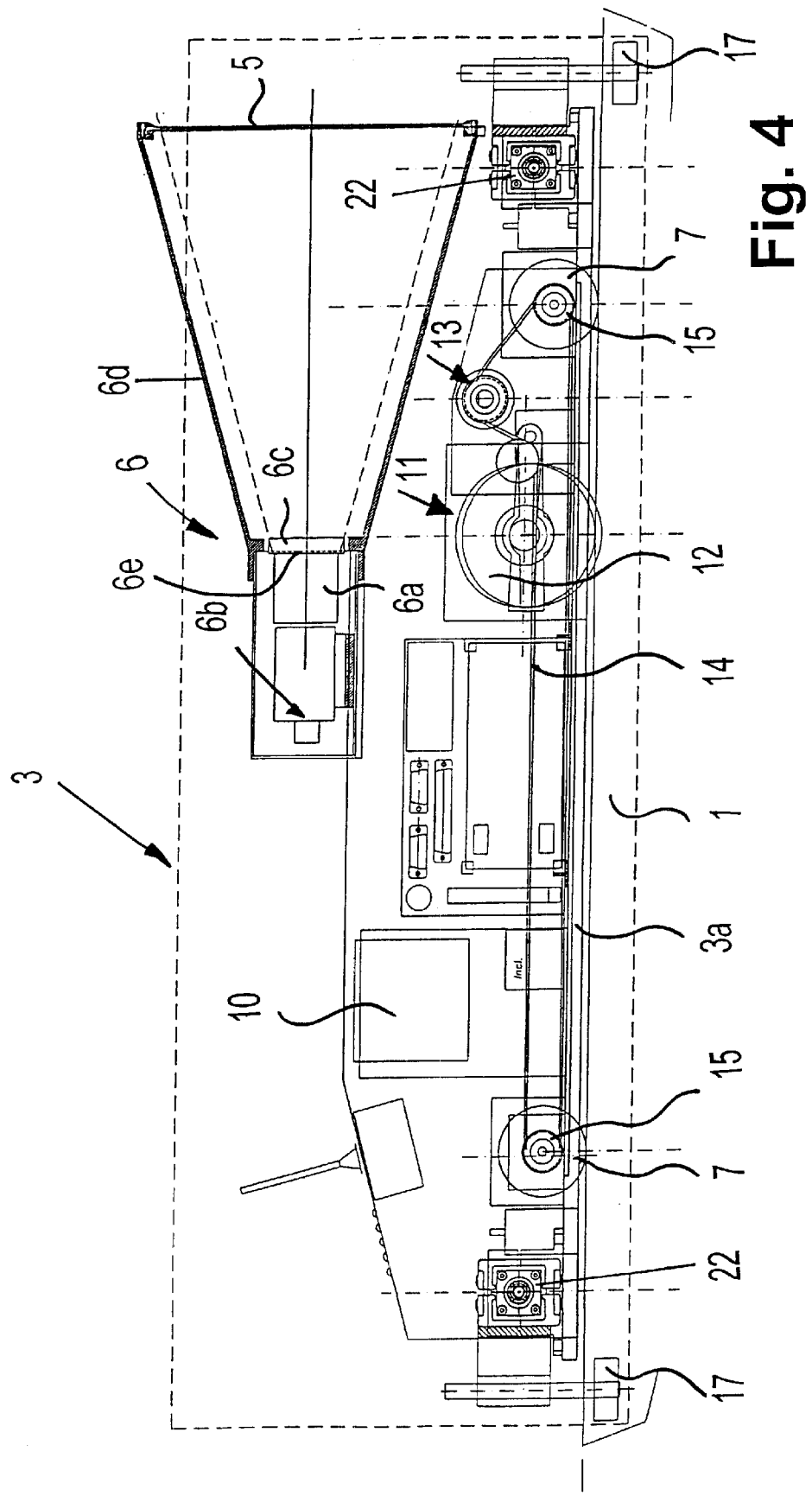
FIG. 4 is a longitudinal section of the detector unit of FIG. 3.

Suitably, a narrow-band interference filter 6e, as shown in FIG. 4, may be positioned into the beam path of the CCD camera 6a to improve the sensibility of the detector unit 3. The image of the laser beam 4 is thereby formed at high contrast in the video image of the CCD camera 6a.

The detector unit 3 is supported on two running rollers 7 for travel along the rail 1. The running rollers 7 are operated in synchronism by a drive motor 13 via a toothed belt 14 and belt-deflecting rollers 15. The running rollers 7 are supported for rotation about horizontal pivot axes 7a, aligned transversely to the longitudinal direction of the rail 1, and are in spaced-apart relation in the mid-section of the detector unit 3. During travel of the detector unit 3, the survey of the rail 1 is realized by registering the shifting point of impact of the laser beam 4 on the measuring surface 5 in response to positional changes of the running surface 8 of the rail 1. Suitably, before commencing the survey, the position of the laser beam 4 at a starting point of the rail 1 is determined with respect to the photodetector 6. As the photodetector 6 is fixedly mounted onto the base panel 3a, the position of the laser beam 4, during travel of the detector unit 3, with respect to the starting position is therefore a precise image of the deviation of the rail 1 in horizontal and vertical directions at the respective measuring position.

The image formed of the laser beam on the matrix 6b can be more accurately evaluated by using a process of the subpixel resolution, in which every image line and every image column in a square region about the laser beam image is individually interpreted and the outcomes are averaged. The result is a "subpixel-accurate" position of the beam image within the matrix 6b and corresponds to or can be translated into the local position of the laser beam 4 in the vertical measuring surface 5, as a consequence of the existing linear correlation between object and image. The point of impact of the laser beam 4 on the diffusion screen 5a can be determined with high precision through conformation of the measured subpixel position of the beam image of the diffusion screen 5a upon the matrix 6b.

The difference with respect to the starting position is a measure for the deviation of the detector unit 3 from the ideal line.

In the description, the term "positional change" denotes the change in position of the highest horizontal point of the running surface 8 of the rail 1. As can be seen from FIGS. 2 and 3, the running rollers 7 are configured as cylinders, thereby ensuring that the detector unit 3 rests via both their running rollers 7 on two spaced-apart measuring points at the highest horizontal contact points 9 of the running surface 8 of the rail 1. Thus, the detector unit 3 and therefore the measuring surface 5 is raised or lowered in dependence on the pattern of the running surface 8 along the rail 1. The laser beam 4 is positionally stabilized in space, i.e. it retains its position in space with high accuracy and thus forms the reference line of the system. The positional stabilization of the laser beam 4 is implemented electronically, preferably by means of an electronic level (not shown), and amounts in the exemplified embodiment +/−1 mm deviation over 100 m length of the laser beam 4.

The measuring surface 5 is connected with an electronic evaluation unit 10 which includes a microprocessor and is controllable by computer programs. The electronic evaluation unit 10 reads the position of the beam image, obtained by the CCD camera 6a in dependence on the incident laser beam 4, and determines in this manner the precise position of the laser beam 4 on the measuring surface 5. In order to determine the point of impact of the principal beam direction of the laser beam 4, the electronic evaluation unit 10 includes a particular computer program which interprets individually each line and each column in a square zone about the beam image and averages the outcomes (0.2 mm per pixel). In order to realize hereby a sufficient linearity and to attain an increase of the measuring accuracy, a measuring camera must be used having a shape with square pixels.

The distance between the transmitter unit 2 and the detection unit 3 is determined by providing the detector unit 3 with a proximity sensor 11. The proximity sensor 11 includes a friction wheel 12, which rolls on the running surface 8 of the rail 1, and is connected to an incremental shaft encoder (not shown), which is linked to the electronic evaluation unit 10, for determining the travel distance of the detector unit 3. In this manner, the distance and/or change in distance between the detector unit 3 and the transmitter unit 2 can be determined with high accuracy. Further, the friction wheel 12 is also used for determination a state of motion of the detector unit 3 by means of the electronic evaluation unit 10 so that in emergency situations, the drive motor 13 of the detector unit 3 can be cut.

Figure 2:
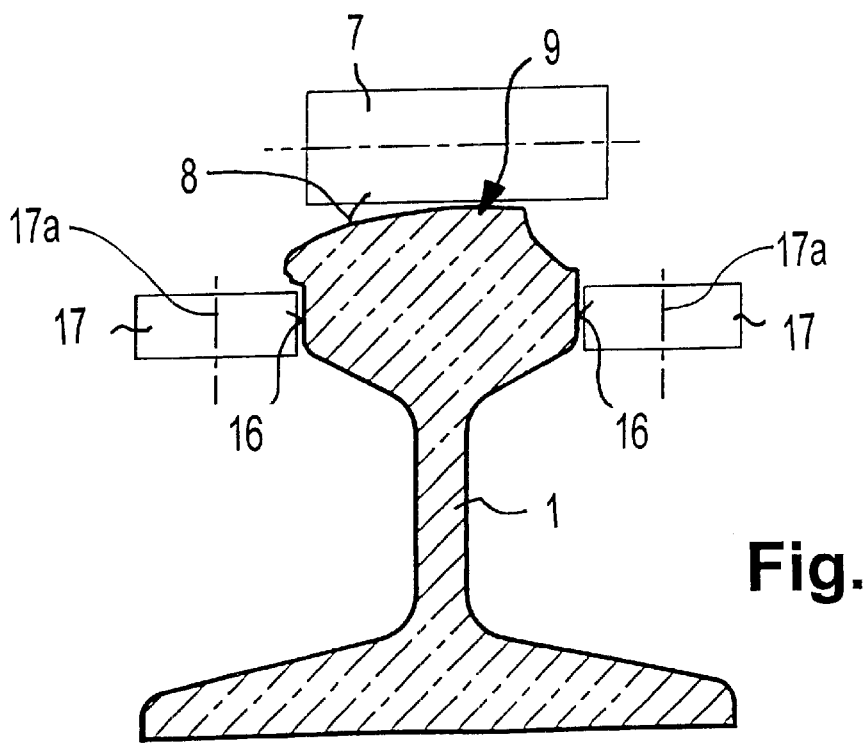
FIG. 2 is a schematic, cross sectional view of an exemplified worn rail, illustrating in detail a position of guide rollers and a running roller of the apparatus of FIG. 1.

As further shown in FIGS. 2, 3 and 4, the detector unit 3 is provided in proximity of its opposite ends, as viewed longitudinally in the direction of the rail 1, with guide rollers 17 on each side of the rail 1 for guiding the detector unit 3 during its travel along the rail 1. The guide rollers 17 are forced against side surfaces 16 (cf. FIG. 2) of the rail 1, e.g. by a spring force (not shown), and supported for rotation about vertical pivot axes 17a. To better conform the guide rollers 17 to the respective cross section of the rail 1, the vertical height of each of the guide rollers 17 is separately adjustable. As shown in the exemplified embodiment of FIG. 3, the running rollers 7 are arranged between the guide rollers 17, whereby the distance between the pivot axis 7a of the running rollers 7 and the pivot axis 17a of the immediately neighboring one of the guide rollers 17 is suitably between one time to three times the diameter of the guide rollers 17.

The guide rollers 17 are so arranged that the pivot axis 17a of the guide rollers 17 on one side of the rail 1 is fixed, whereas the guide rollers 17 on the other side of the rail 1 are forced against the side surface 16 by the spring force. Suitably, the guide rollers 17, 18 are supported by ball bearing, e.g., self-aligning ball bearings (not shown), to better conform to inclined rails.

Figure 5:
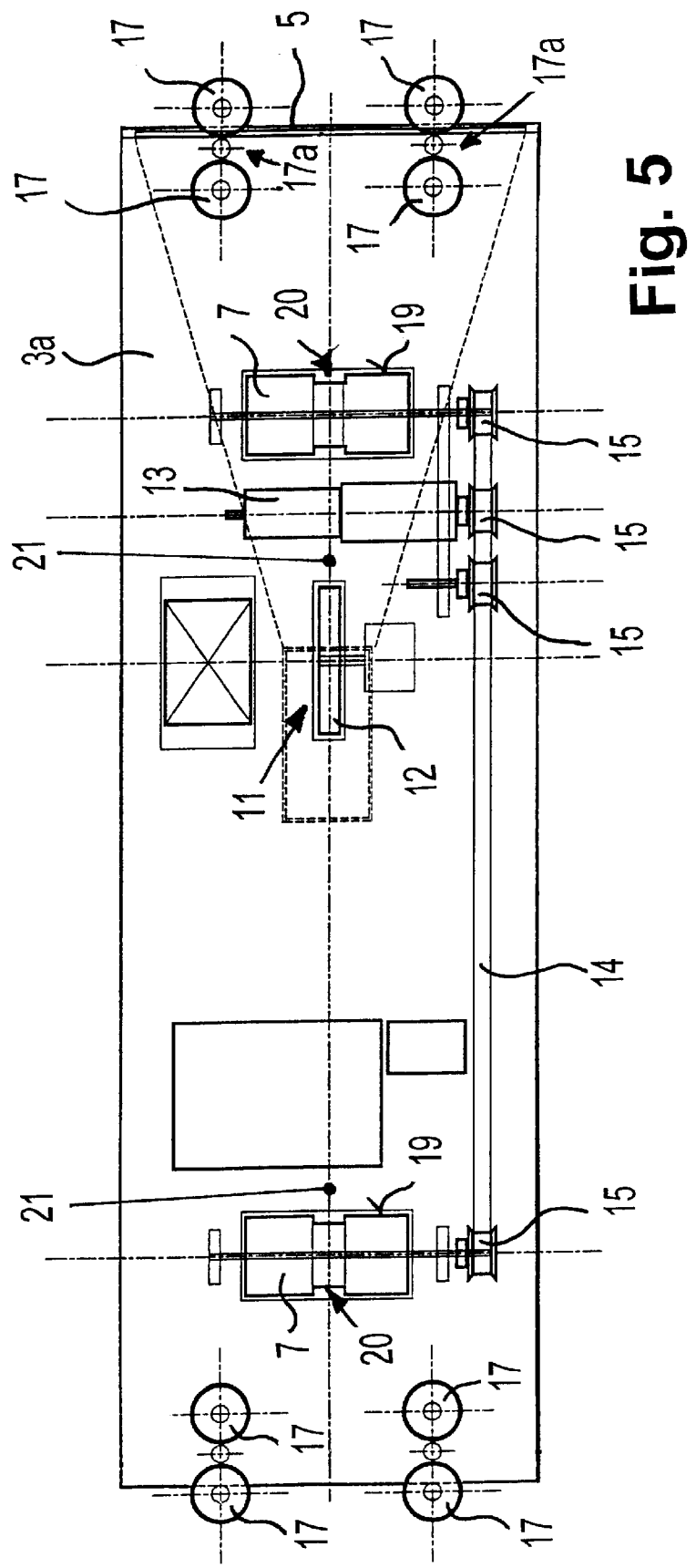
FIG. 5 is a top view of a modification of a detector unit of an apparatus for surveying a rail, in accordance with the present invention.

Turning now to FIG. 5, there is shown an alternative embodiment of the surveying apparatus according to the present invention, in which the guide rollers 17 are arranged in pairs on either side of the rail 1 at the opposite ends of the detector unit 3 and secured on a common carrier 22 (FIG. 4) which extends transversely to the rail direction and is articulated to the base panel 3a of the detector unit 3. The pairs of guide rollers 17 are so arranged that the pivot axes 17a of the guide rollers 17 on one side of the rail 1 are fixed, whereas the guide rollers 17 on the other side of the rail 1 are forced by a spring force against the pertaining side surface 16.

As shown in FIG. 5, the running rollers 7 have a running surface 19 which is formed approximately in mid-section of the running roller 7 a radial groove 20 to ensure a more stable two-point support of the running rollers 7 on the rail 1.

Suitably, the detector unit 3 has a built-in safety system, which is integrated in the electronic evaluation unit 10, for preventing a crash of the rail surveying apparatus, when the rail 1 is heavily worn off. The safety system includes additional horizontal proximity sensors, indicated schematically at 21 which determine the distance of a reference point of the detector unit 3 from the running surface 8 of the rail 1 and cuts the drive motor 13 when a limit value is exceeded.

Figure 6:
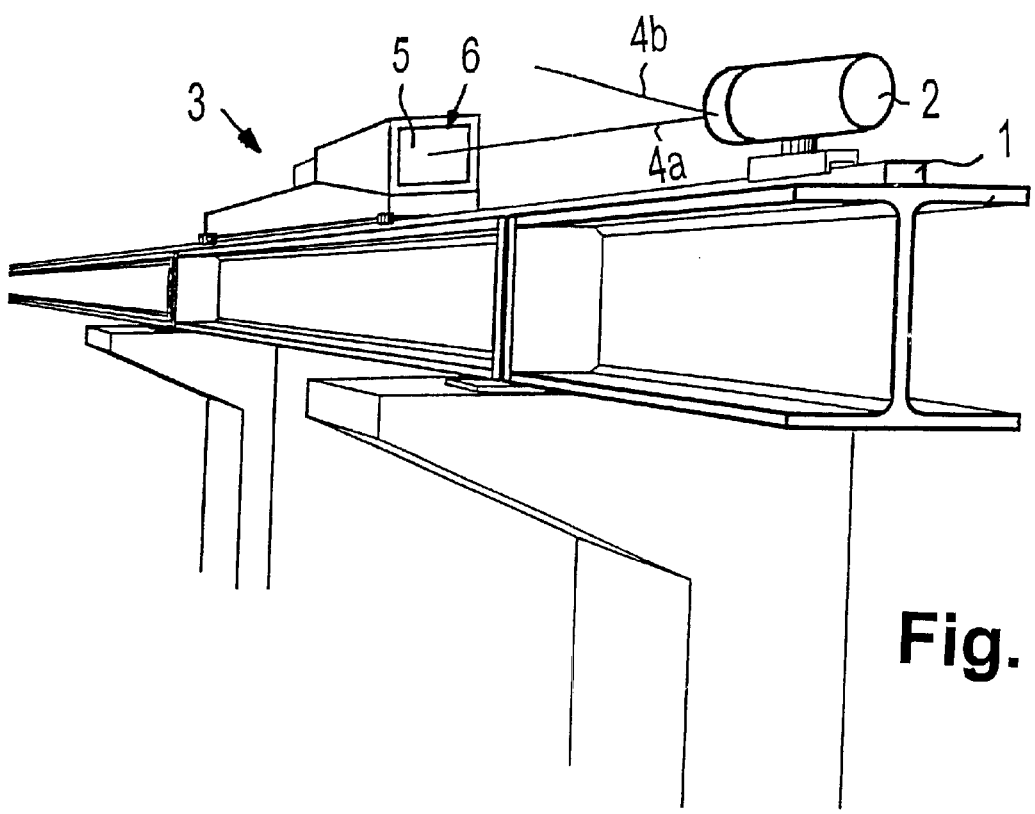
FIG. 6 is a schematic, three-dimensional illustration of an apparatus for surveying two rails, in accordance with the present invention

Turning now to FIG. 6, there is shown a variation of the apparatus according to the present invention for surveying two rails in side-by-side relation (only one is shown in FIG. 6), which are positioned roughly in one plane. In this embodiment, the laser beam radiating from the detector unit 4 is split into two horizontal partial laser beams 4a, 4b, which extend perpendicular to one another, for determination of the height difference of both rails 1. This is realized in relation to a horizontal straight line, which extends in a vertical plane defined by the partial laser beam 4b extending transversely to both rails 1.

While the invention has been illustrated and described as embodied in an apparatus and method for surveying rails, in particular running rails for cranes, shelf handling units, running wheel blocks, it is not intended to be limited to the details shown since various modifications and structural changes may be made without departing in any way from the spirit of the present invention.

What is claimed as new and desired to be protected by Letters Patent is set forth in the appended claims:

1. Apparatus for surveying a rail, comprising:
   a transmitter unit arranged on the rail and emitting a laser beam which is aligned longitudinally in the direction of a rail and is incident on a measuring surface, wherein the transmitter unit has an electronic level to maintain the emitted laser beam stabilized in position;
   a detector unit designed for mobility along the rail and having at least two vertically rotatably supported guide rollers arranged in spaced-apart relation longitudinally in the direction of the rail, and forced against opposite side surfaces of the rail for guiding the detector unit during travel, wherein each of the guide rollers has on one side of the rail a fixed pivot axis and is forced on the other side of the rail against a respective one of the side surfaces of the rail, at least two running rollers arranged in spaced-apart relation longitudinally in the direction of the rail for travel on the running surface of the rail, wherein the running rollers are horizontally supported for rotation about pivot axes which are aligned transversely to the longitudinal rail direction, with at least one of the running rollers being designed for moving the detector unit, and a photodetector which confronts the laser beam and has a matrix in the form of a plurality of neighboring optical sensor elements for generating electric output signals in response to the incident laser beam on the measuring surface, said photodetector being an opto-electronic camera, said detector unit including a transparent diffusion screen, positioned anteriorly of the camera, to define the measuring surface which is optically projected onto the matrix of the photodetector;
   an electronic evaluation unit receiving the output signals from the sensor elements for determining in purely electronic fashion the point of impact and thereby the position of the laser beam on the measuring surface; and
   a proximity sensor for determining a change in distance between the transmitter unit and the detector unit.

2. The apparatus of claim 1 wherein the matrix has a rectangular configuration, said measuring surface being disposed vertically in transverse relation to the longitudinal direction of the rail.

3. The apparatus of claim 1 wherein the camera is a CCD camera.

4. The apparatus of claim 1 wherein the point of impact of the laser beam on the measuring surface is determined through conformation of a measured subpixel position of the laser beam image of the measuring surface on the matrix.

5. The apparatus of claim 4 wherein the conformation is realized by means of a computer program.

6. The apparatus of claim 1 wherein the evaluation unit includes a microprocessor.

7. The apparatus of claim 1 wherein the proximity sensor has a friction wheel which rolls on a running surface of the rail.

8. The apparatus of claim 7 wherein the friction wheel is connected with an incremental shaft encoder for determining a distance traveled by the detection unit.

9. The apparatus of claim 7 wherein the friction wheel has means for determining a state of motion of the detector unit.

10. The apparatus of claim 1 wherein the detector unit has means for remote-controlled operation of the detector unit.

11. The apparatus of claim 1 wherein the transmitter unit is stabilized in position by the electronic level by +/−1 mm deviation over 100 m of rail length.

12. The apparatus of claim 1 wherein the guide rollers have means for individually adjusting a vertical height of each of the guide rollers.

13. The apparatus of claim 1 wherein in longitudinal direction of the rail, a leading one of the running roller trails a leading one of the guide rollers.

14. The apparatus of claim 1 wherein the pivot axis of each of the running rollers is spaced from an axis of the immediately neighboring one of the guide rollers at a distance which is between one time to three times of a guide roller diameter.

15. The apparatus of claim 1 wherein the guide rollers are urged by a spring against the respective side surface of the rail.

16. The apparatus of claim 1, and further comprising a transverse carrier, said guide rollers being arranged in pairs on the transverse carrier which extends longitudinally in the direction of the rail and is disposed on the detector unit.

17. The apparatus of claim 1 wherein each of the running rollers is supported on the rail via a two-point support.

18. The apparatus of claim 17 wherein each of the running rollers has a running surface having formed therein in mid-section a radial groove for realizing the two-point support of each of the running rollers on the rail.

19. The apparatus of claim 1 wherein the detector unit has incorporated therein a safety system for preventing crashes of the detector unit when the rail is worn off.

20. The apparatus of claim 19 wherein the safety system has at least one proximity sensor for determining a distance of a reference point of the detector unit to the rail.

21. The apparatus of claim 1 for survey of at least two rails extending in one plane, wherein the laser beam is split into two horizontal partial laser beams which extend perpendicular to one another for determining the height difference of the two rails.

22. The apparatus of claim 1, and further comprising a narrow band filter disposed into the path of the laser beam between the measuring surface and the matrix of the photodetector.

23. The apparatus of claim 22, wherein the narrow band filter is an interference filter.

* * * * *